United States Patent
Baladi et al.

(10) Patent No.: US 10,316,696 B2
(45) Date of Patent: Jun. 11, 2019

(54) SYSTEM AND METHOD FOR IMPROVING EXHAUST ENERGY RECOVERY

(71) Applicant: General Electric Company, Schenectady, NY (US)

(72) Inventors: Mehdi Milani Baladi, Evendale, OH (US); Abdus Shamim, West Chester, OH (US); Joseph Anthony Cotroneo, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 722 days.

(21) Appl. No.: 14/707,938

(22) Filed: May 8, 2015

(65) Prior Publication Data

US 2016/0326960 A1 Nov. 10, 2016

(51) Int. Cl.
*F01D 25/30* (2006.01)
*F02C 7/12* (2006.01)
(Continued)

(52) U.S. Cl.
CPC .......... *F01D 25/305* (2013.01); *F01D 11/24* (2013.01); *F01D 25/08* (2013.01); *F01D 25/12* (2013.01);
(Continued)

(58) Field of Classification Search
CPC ...... F02C 6/06; F02C 6/08; F02C 7/18; F02C 6/18; F02C 9/18; F05D 2260/601;
(Continued)

(56) References Cited

U.S. PATENT DOCUMENTS 4,550,562 A * 11/1985 Rice .................. F01K 23/10
60/728
5,076,050 A 12/1991 Schwarz et al.
(Continued)

FOREIGN PATENT DOCUMENTS

CN 101327844 A 12/2008
CN 203114426 U 8/2013

OTHER PUBLICATIONS

European Search Report & Opinion issued in connection with corresponding EP Application No. 16168573.0 dated Sep. 21, 2016.
(Continued)

*Primary Examiner* — Todd E Manahan
*Assistant Examiner* — Marcos O Diaz
(74) *Attorney, Agent, or Firm* — Fletcher Yoder P.C.

(57) ABSTRACT

A system includes a turbine with an expansion section configured to expand an exhaust flow in a downstream direction, such that the expansion section includes a plurality of stages and a diffuser section coupled downstream of the expansion section. The diffuser section receives the exhaust flow along an exhaust path and an energizing flow along a wall, and the diffuser section includes the wall comprising an inner surface, so the wall is disposed about the exhaust path, and an energizing port disposed in the wall at or downstream of a last stage of the plurality of stages of the expansion section. The energizing port is configured to direct the energizing flow along the inner surface of the wall to energize a boundary layer along the wall, and a first pressure of the energizing flow is greater than a second pressure of the exhaust flow at the energizing port.

19 Claims, 7 Drawing Sheets

(51) Int. Cl.
  *F01D 11/24* (2006.01)
  *F02C 9/18* (2006.01)
  *F01D 25/08* (2006.01)
  *F01D 25/12* (2006.01)
  *F01D 25/14* (2006.01)
  *F02C 6/18* (2006.01)

(52) U.S. Cl.
  CPC ............. *F01D 25/14* (2013.01); *F01D 25/30* (2013.01); *F02C 6/18* (2013.01); *F02C 7/12* (2013.01); *F02C 7/125* (2013.01); *F02C 9/18* (2013.01); *F05D 2260/2322* (2013.01); *F05D 2270/17* (2013.01); *F05D 2270/173* (2013.01); *Y02T 50/671* (2013.01); *Y02T 50/676* (2013.01)

(58) Field of Classification Search
  CPC ........... F05D 2270/17; F05D 2270/173; F05D 25/12; F05D 25/14; F05D 25/30; F05D 25/305; F02K 1/28; F02K 1/34; F02K 1/36; F02K 1/38; F02K 1/46; F01D 11/24
  See application file for complete search history.

(56) References Cited

U.S. PATENT DOCUMENTS

| | | | |
|---|---|---|---|
| 5,399,066 A | 3/1995 | Ritchie et al. | |
| 5,579,631 A * | 12/1996 | Chen | F02C 7/16 60/39.3 |
| 6,434,943 B1 | 8/2002 | Garris | |
| 6,463,729 B2 | 10/2002 | Magoshi et al. | |
| 6,588,197 B2 | 7/2003 | Tanaka et al. | |
| 6,896,475 B2 | 5/2005 | Graziosi et al. | |
| 7,114,914 B2 | 10/2006 | Gendraud et al. | |
| 7,293,953 B2 | 11/2007 | Leach et al. | |
| 7,431,557 B2 | 10/2008 | Herron et al. | |
| 7,503,179 B2 | 3/2009 | Estridge et al. | |
| 7,597,537 B2 | 10/2009 | Bucaro et al. | |
| 7,785,063 B2 | 8/2010 | McQuiggan et al. | |
| 7,886,520 B2 | 2/2011 | Stretton et al. | |
| 8,113,769 B2 | 2/2012 | Takahashi et al. | |
| 8,161,754 B2 | 4/2012 | Sheaf et al. | |
| 8,276,364 B2 | 10/2012 | Levasseur | |
| 8,342,798 B2 | 1/2013 | Floyd, II et al. | |
| 8,418,471 B2 | 4/2013 | Baltas | |
| 8,453,458 B2 | 6/2013 | Whurr et al. | |
| 8,601,822 B2 | 12/2013 | Paradise | |
| 8,668,431 B2 | 3/2014 | Rog et al. | |
| 8,669,670 B2 | 3/2014 | Donnelly et al. | |
| 8,720,182 B2 | 5/2014 | Jain | |
| 8,721,257 B2 | 5/2014 | Lewis et al. | |
| 8,726,629 B2 | 5/2014 | Coney | |
| 8,794,008 B2 | 8/2014 | Eroglu et al. | |
| 2011/0056179 A1* | 3/2011 | Orosa | F01D 25/30 60/39.5 |
| 2013/0000305 A1* | 1/2013 | Smith | F02K 1/28 60/697 |

OTHER PUBLICATIONS

Machine Translation and First Office Action and Search issued in connection with corresponding CN Application No. 201610295362.7 dated Dec. 26, 2018.

* cited by examiner

SYSTEM AND METHOD FOR IMPROVING EXHAUST ENERGY RECOVERY

BACKGROUND

The subject matter disclosed herein relates to gas turbine engines, such as a system and method for improving exhaust recovery.

Gas turbine systems generally include a compressor, a combustor, and a turbine. The combustor combusts a mixture of compressed air and fuel to produce hot combustion gases directed to the turbine to produce work, such as to drive an electrical generator. The compressor compresses air from an air intake, and subsequently directs the compressed air to the combustor.

Traditional clearance control units for the turbine utilize pressurized bleed air from the compressor section of the gas turbine for clearance control of turbine blades. However, the energy utilized to compress the bleed air is lost, thereby reducing the efficiency of the gas turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine configured to expand an exhaust flow in a downstream direction in a plurality of expansion sections. The turbine includes a cooling manifold and a passage disposed about a diffuser section. The diffuser section is configured to receive the exhaust flow along an exhaust path and an energizing flow along a wall, and an inner surface along the wall of the exhaust path with numerous energizing ports disposed in the wall at or downstream of a last stage of the plurality of stages of the expansion section such that the energizing ports direct the energizing flow along the inner surface of the wall to energize a boundary layer along the wall, and a first pressure of the energizing flow is greater than a second pressure of the exhaust flow at the energizing port.

In a second embodiment, a method includes expanding an exhaust gas through a plurality of turbine stages of a turbine section, such that the exhaust gas flows in a downstream direction through the plurality of turbine stages, receiving the exhaust gas in a diffuser section downstream of the turbine section, and strengthening a boundary layer of an energizing flow downstream of an energizing port of the diffuser section by injecting the energizing flow downstream of the turbine section, such that the boundary layer is disposed between a wall of the diffuser section and the exhaust gas, the energizing flow has a higher pressure than the exhaust gas at the energizing port, and the boundary layer is configured to reduce a pressure loss of the exhaust gas through the diffuser section.

In a third embodiment, a cooling manifold is disposed about an expansion section of a turbine, such that the cooling manifold is configured to direct a cooling flow toward a turbine casing of the expansion section. The diffuser section may be coupled to the cooling manifold, such that the diffuser section is configured to receive an exhaust gas from the expansion section and the cooling flow from the cooling manifold, and the diffuser section includes an energizing port configured to energize a boundary layer with the cooling flow between a wall and the exhaust gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
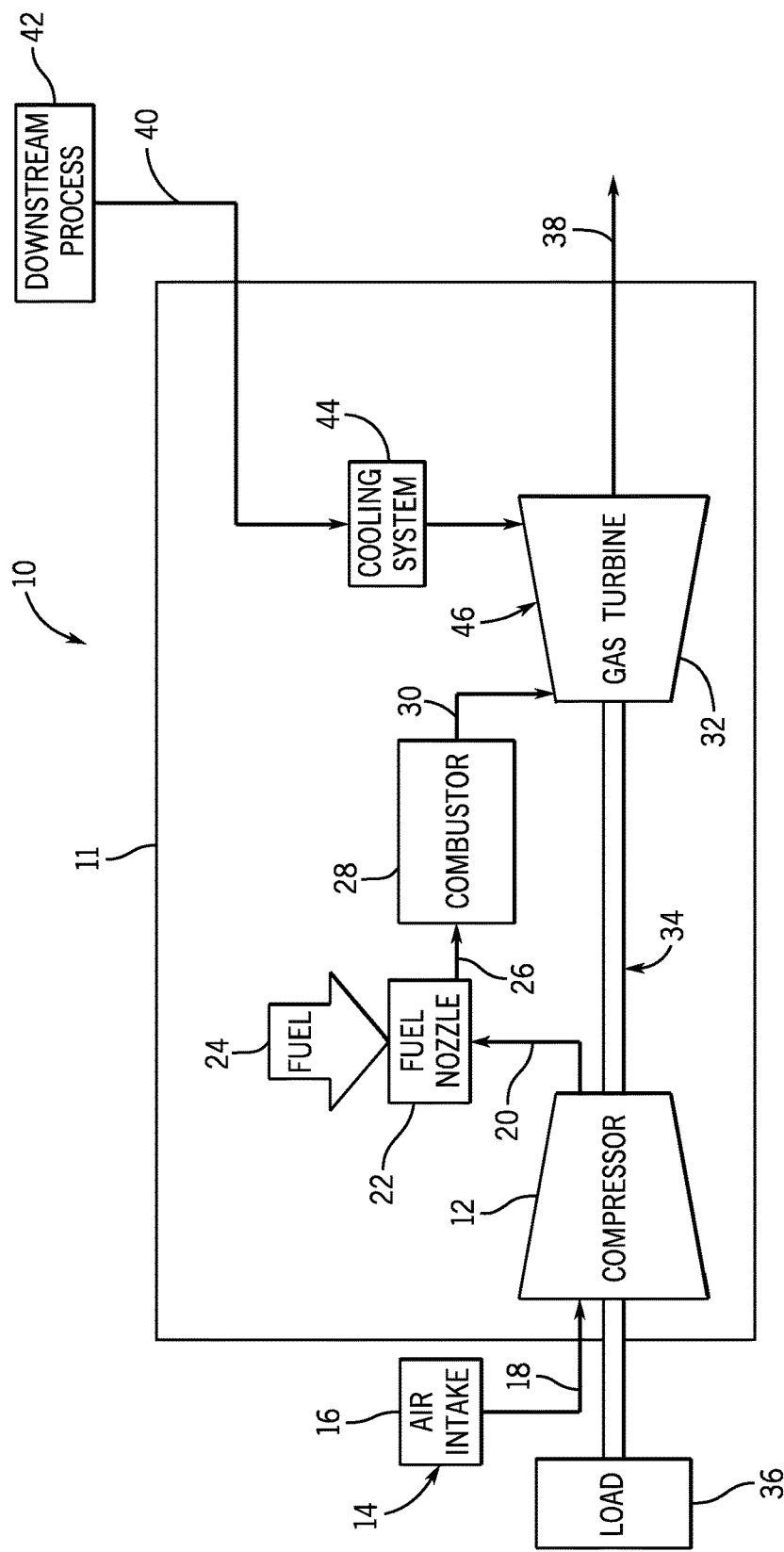
FIG. 1 is a block diagram of an embodiment of a gas turbine system and a system for improving exhaust energy recovery.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A system and a method for improving exhaust energy recovery through the utilization of spent clearance control impingement fluid (e.g., air, steam) is described in detail below. The embodiments of the exhaust energy recovery system include a cooling manifold disposed about a gas turbine to direct a cooling fluid to a turbine casing and a second external casing to direct the impingement (e.g., cooling) fluid to strategic areas where the main flow stream has potential for separation. As discussed in detail below, directing the cooling fluid to the strategic areas may reduce separation of the main flow stream from the interior (e.g., inner) surface of the gas turbine, thereby reducing pressure losses of the main flow stream. In some embodiments, the gas turbine utilized in the system and the method for improving exhaust energy recovery may include an aero derivative gas turbine engine. In some embodiments, a portion of the turbine casing is cooled with the cooling fluid, such as pressurized bleed air from the compressor section, to help protect the internal components housed in the turbine casing from impact with an inside interior surface of the turbine casing by controlling the thermal expansion and thermal contraction of the portion of the turbine casing. The cooling fluid (e.g., pressurized bleed air from the compressor section of the turbine, a steam from a downstream process) has energy that can be utilized to do additional useful work (e.g., heat a fluid, drive a turbine) within the gas turbine system. Separation of the main flow (e.g., exhaust gas) downstream of the last turbine blades caused by weak boundary layers of the main flow may reduce the pressure of the main flow, which may reduce the useful work that may be recovered from the main flow downstream of the last turbine blades. As discussed herein, injecting a cooling fluid (e.g., impingement fluid, compressor bleed flow, steam, low pressure air) may energize the boundary layer downstream of the last turbine blades of the gas turbine. Energizing the boundary layer with the fluid is believed to pull the main flow (e.g., exhaust gas) towards an interior surface of a diffuser section downstream of the last turbine blades so the main flow does not detach from its flow path.

In some embodiments, a cooling fluid (e.g., air, steam) may be utilized to control the clearance of a plurality of turbine blades and other internal parts from the turbine casing. The cooling fluid may include, but is not limited, to air (e.g., pressurized air, low pressure air), steam (e.g., high pressure steam, intermediate pressure steam, low pressure steam, low grade steam, low grade waste steam), carbon dioxide (e.g., high pressure carbon dioxide, low pressure carbon dioxide), and combinations thereof. The cooling fluid may further be utilized in a diffuser section downstream of the expansion section where the clearance control occurs. The cooling fluid may be directed to a diffuser section of the turbine, where the cooling fluid may be utilized in certain locations to reduce or eliminate boundary layer separation. As discussed herein, a portion of the cooling fluid is directed through a passage (e.g., flow collection passage) coupled to the cooling manifold. The passage is configured to receive the cooling fluid utilized for clearance control, and to direct the cooling fluid into points where the boundary layer of the main flow tends to separate from the diffuser section, thereby reducing the pressure of the main flow. The cooling fluid (e.g., air, steam) utilized for clearance control and subsequently utilized in the passage (e.g., flow collection passage) may be received from a compressor or another source, such as a steam turbine. The cooling fluid received by the cooling manifold can be between about 0.001 to 50 psig, about 0.01 to 40 psig, about 0.1 to 30 psig, or about 1 to 20 psig (about 0.007 to 345 kpa, about 0.067 to 276 kpa, about 0.689 kpa to 207 kpa, or about 6.895 kpa to 138 kpa) relative to the ambient environment. After the cooling fluid is directed to the cooling manifold to control the clearance between the turbine casing and interior components (e.g., blades), the cooling fluid can be further utilized in the passage (e.g., flow collection passage). The passage can be configured to direct the cooling fluid to the various areas or sections of the diffuser section to energize (e.g., reinforce, strengthen) the boundary layers. The passage can be configured to direct the cooling fluid to the gas turbine casing and/or diffuser section through a plurality of apertures or openings. Heat energy of the cooling fluid may be extracted along with the heat energy of the exhaust gas via one or more downstream systems (e.g., heat recovery steam generator (HRSG), steam turbine). Additionally, directing the cooling fluid from the cooling manifold to the diffuser section may reduce or eliminate cooling fluid vented within an enclosure that at least partially surrounds the gas turbine. Reducing or eliminating cooling fluid vented to the enclosure may reduce the temperature of the environment within the enclosure, thereby reducing stress and/or temperature effects on operators and/or controllers within the enclosure.

Turning now to the drawings, FIG. 1 illustrates block diagram of an embodiment of a gas turbine system 10 and a system for improving exhaust energy recovery. The gas turbine system 10 may be open to the atmosphere or may be housed in an enclosure 11, such as an acoustic enclosure. The compressor 12 intakes ambient air 14 to the gas turbine system 10 via an air intake 16. The ambient air 14 is taken in by the air intake 16 into the gas turbine system 10 via a suitable mechanism, such as a cold air intake, for subsequent delivery of an inlet air 18 into the compressor 12. As discussed herein, the inlet air 18 may be an oxidant including, but not limited, to the ambient air 14, oxygen, oxygen-enriched air, recirculated exhaust gas, or any combination thereof. The compressor 12 compresses the inlet air 18, forming pressurized air 20 by rotating blades within the compressor 12. When the compressor 12 compresses the inlet air 18, the compressor adds energy to the inlet air 18, thereby increasing the pressure and the temperature such that the pressurized air 20 is warmer and at a higher pressure than the ambient air 14. The pressurized air 20 may be discharged into one or more fuel nozzles 22, which mix the pressurized air 20 and a fuel 24 (e.g., a liquid fuel and/or gas fuel, such as natural gas) to produce an air-fuel mixture 26 suitable for combustion.

As depicted, the pressurized air 20 enters a fuel nozzle 22 and mixes with fuel 24. The fuel nozzle 22 directs the air fuel mixture 26 into a combustor 28. The combustor 28 ignites and combusts the air-fuel mixture 26, to form combustion products 30. The combustion products 30 are directed to a gas turbine 32, where the combustion products 30 expand and drive blades of the gas turbine 32 about a shaft 34. The gas turbine 32 is coupled to the compressor 12 and drives the compressor 12 by a common shaft 34. The gas turbine 32 may also drive a load 36 via the common shaft 34. Compressor vanes or blades are included as components of a compressor 12. Blades within the compressor 12 are coupled to the shaft 34, which is driven by the gas turbine 32. The common shaft 34 may be coupled to several components (e.g., compressor 12, gas turbine 32, load 36) throughout the gas turbine system 10. As will be appreciated, the load 36 may include an electrical generator, a compressor, a propeller of an airplane, and so forth. Eventually, the combustion products 30 exit the gas turbine 32 as exhaust gases 38, which then exit the gas turbine system 10 via an exhaust outlet. The exhaust gases 38 are directed outside the enclosure 11.

As discussed herein, a pressurized fluid 40 from a downstream process 42 can be directed to the gas turbine system 10 and utilized in a cooling system 44 to improve exhaust energy recovery. The pressurized fluid 40 may include, but is not limited, to air (e.g., pressurized air, low pressure air), steam (e.g., high pressure steam, intermediate pressure steam, low pressure steam, low grade steam, low grade waste steam), carbon dioxide (e.g., high pressure carbon dioxide, low pressure carbon dioxide) or any combination thereof having a pressure greater than an ambient pressure of the external environment. While some embodiments of the pressurized fluid discussed below utilize steam, the pressurized fluid is not intended to be restricted to steam. The pressurized fluid 40 may be defined as having a higher pressure than the exhaust gases where it is being injected. The pressurized fluid 40 can be impinged (e.g., at high velocity) onto targeted locations on a gas turbine casing 46 to increase local convective coefficients and to increase heat transfer from the gas turbine casing 46. The turbine casing 46 will thermally expand or contract based on the temperature of the turbine casing 46, thereby affecting the clearance between rotating and stationary components housed in the gas turbine 32 and an interior surface 54 of the gas turbine 32. As discussed in detail below, after the pressurized fluid 40 is utilized to control the clearance of the turbine casing 46 via control of the temperature of the turbine casing 46, the pressurized fluid 40 can be injected into a flow path downstream of the last row of blades of the gas turbine 32 where the main flow of exhaust gases 38 has weaker boundary layers with potential for separation from the interior wall surface 54 and pressure losses. The injected pressurized fluid 40 has higher pressure than the main flow path gases, and as such, fluidic techniques can be utilized to energize a boundary layer of the diffuser section of the gas turbine 32. Energizing the boundary layer can reduce or eliminate flow separation and recirculation flows of the exhaust gases 38 from the interior wall surface 54. Accordingly, energizing the boundary layer may cause a lower pressure drop across a diffuser section 62 of the gas turbine 32, thereby enabling increased exhaust pressure recovery via systems coupled downstream of the gas turbine 32. Moreover, thermal energy added to the main flow of exhaust gases 38 by the injecting spent cooling fluid 40 may increase the energy recovered by the downstream systems.

Figure 2:
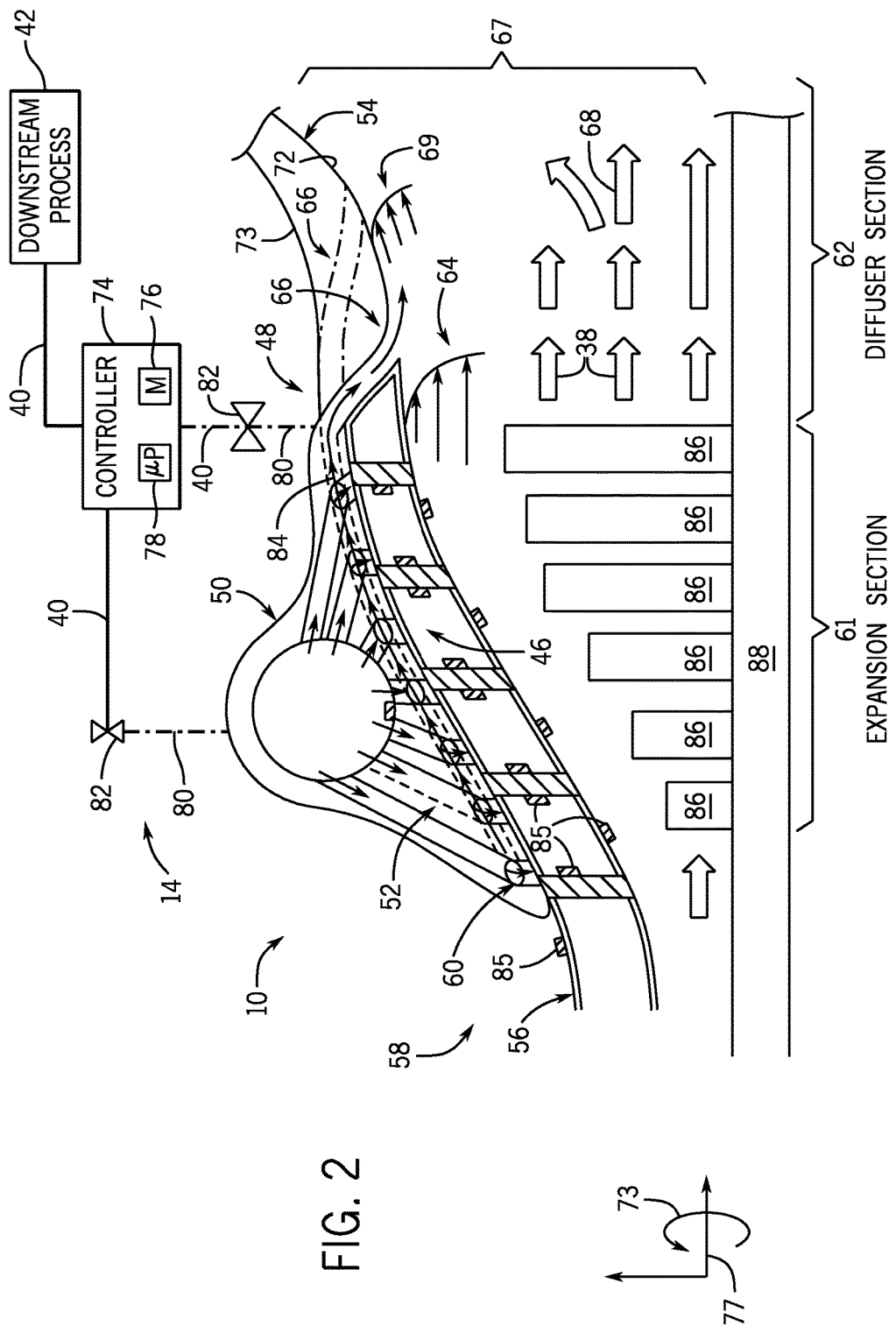
FIG. 2 is a radial section view of an embodiment of the gas turbine system and the improved exhaust energy recovery system.

FIG. 2 illustrates a radial section view of an embodiment of the gas turbine system 10 and the improved exhaust energy recovery system. As discussed above, the pressurized fluid 40 is initially directed to the turbine casing 46 of the gas turbine 32 to control the clearance of the internal parts (e.g., turbine blades) of the gas turbine 32 from the turbine casing 46, and is subsequently directed through a passage 48 (e.g., flow collection passage) coupled to a cooling manifold 50. A portion of the pressurized fluid 40 is directed to the turbine casing 46 through cooling passages 52 of the cooling manifold 50. The portion of the cooling fluid 40 is directed to the exterior surface 56 through a plurality of cooling manifold openings 60. One or more (e.g., all) of the cooling manifold openings 60 may be utilized at a time to distribute the cooling fluid 40 to the exterior surface 56, thereby cooling the turbine casing 46. The cooling manifold 50 and cooling passages 52 may be coupled to the passages 48 disposed around the diffuser section 62. Directing the cooling fluid 40 from the cooling manifold 50 to the diffuser section 62 eliminates the cooling fluid 40 from being vented within the enclosure 11 such that the temperature of the environment of the enclosure 11 is reduced. In some embodiments, the cooling fluid 40 and the compressed air flow may be isolated from the enclosure 11. In some embodiments, the cooling fluid 40 may be warmer than the ambient environment about the gas turbine system 10, and the cooling fluid 40 may be cooler than the exhaust gases 38 through the gas turbine 32. The specific heat of the low pressure steam when utilized as the pressurized fluid 40 may be greater than air of the ambient environment or the compressor bleed air.

As discussed herein, after the pressurized fluid 40 cools the exterior surface 56, the cooling fluid 40 can be utilized for other purposes, thereby recovering at least some of the energy of the cooling fluid 40. For example, the cooling fluid 40 may be utilized downstream of an expansion section 61 the gas turbine 32 to energize the boundary layer of the main flow of the exhaust gases 38. The expansion section 61 of the gas turbine 32 expands the exhaust gases in a downstream direction 77 and may include multiple expansion stages. The expansion stages may correspond to each stage of blades 86. The cooling fluid 40 can be injected to the passage 48, which can be coupled to the cooling manifold 50. The passages 48 (e.g. flow collection passages) may collect the cooling fluid 40 from the cooling manifold 50 via the cooling passages 52 such that the cooling fluid 40 is directed to the diffuser section 62. The cooling fluid 40 is directed to the diffuser section 62 to energize the boundary layer and reduce or eliminate flow separation, thus improving diffuser pressure recovery. Prior to injection of the cooling fluid 40 into the diffuser section 62, a first velocity profile 64 of the exhaust gases 38 is shown. The first velocity profile 64 at the exit of the expansion section 61 depicts the weaker boundary layers. After the injection of the cooling fluid 40 into the diffuser section 62, a second velocity profile 69 is formed. As depicted, the boundary layers are strengthened due to cooling fluid 40 (e.g., blowing flow) energizing the boundary layer.

Figure 3:
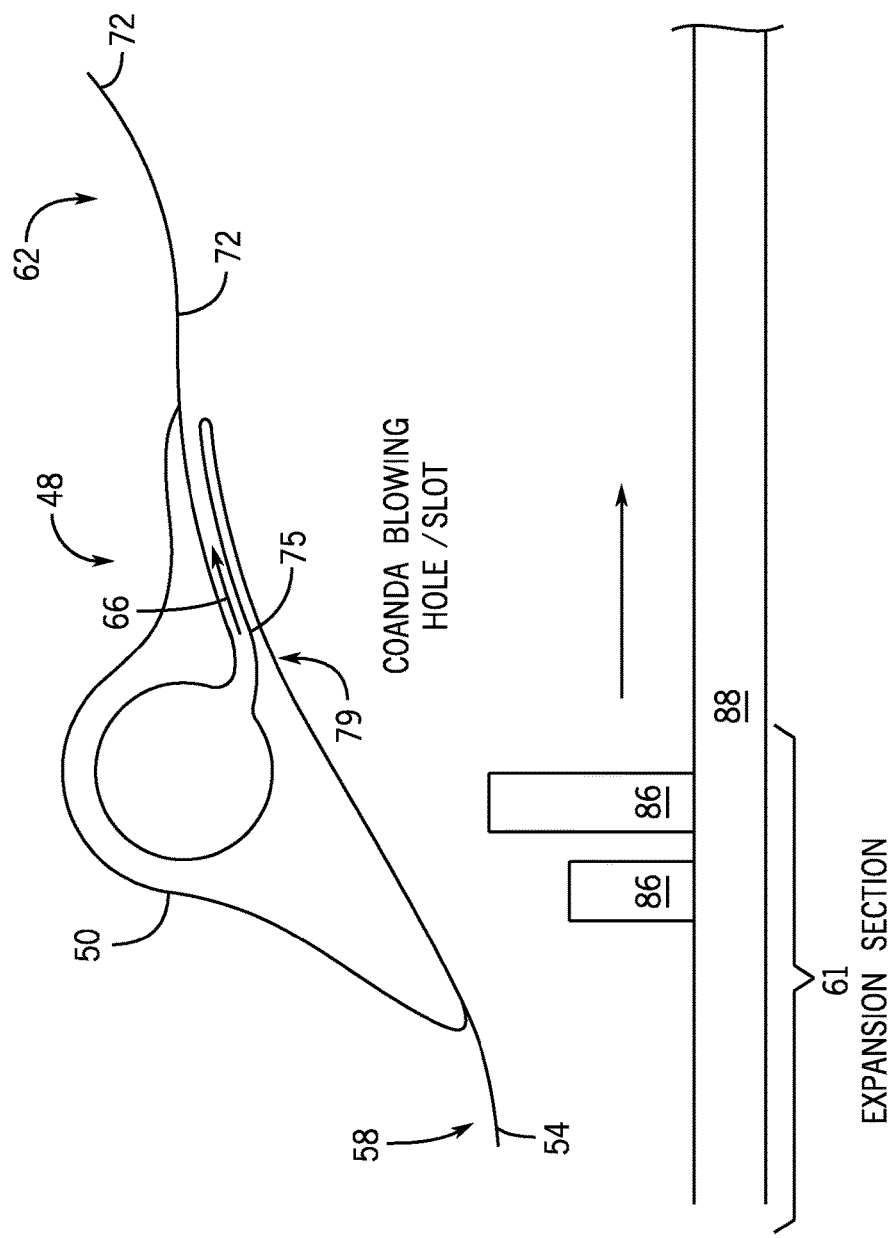
FIG. 3 is a diagram of an embodiment of the gas turbine system exhibiting the Coanda effect by a Coanda blowing hole/slot.
Figure 6:
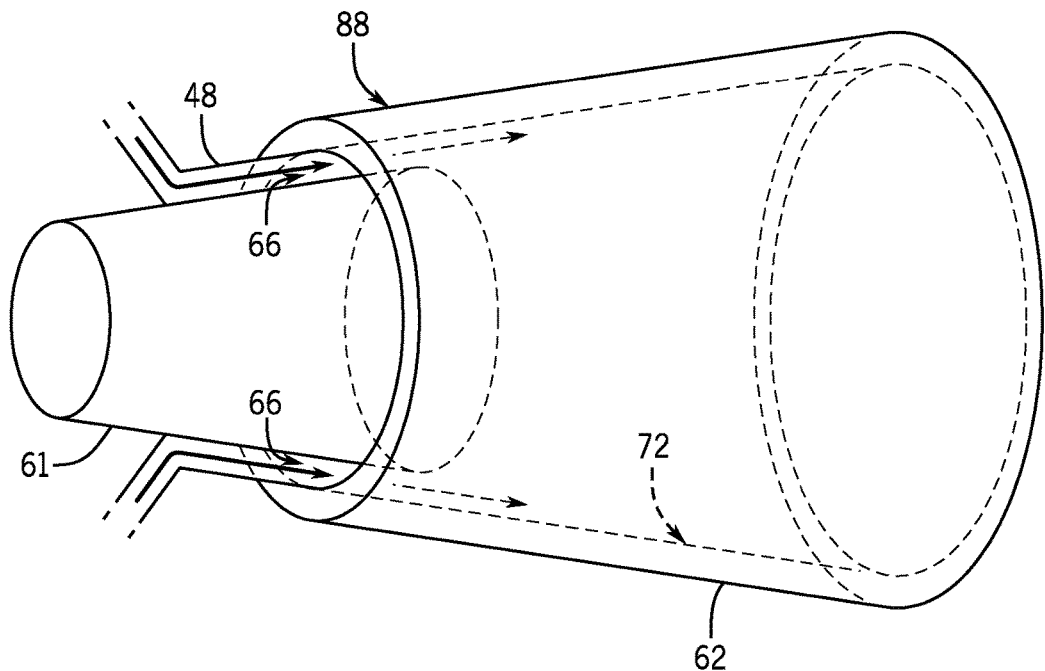
FIG. 6 is a perspective view of an embodiment of an expansion section and a diffuser section of the gas turbine of the gas turbine system.

FIG. 3 is a diagram of a Coanda blowing slot 75. For the case of slot injection tangent to the diverging interior surface 72 of the diffuser section 62, the Coanda effect can be used to keep the boundary layer attached to the interior surface 72. This Coanda effect describes the tendency of moving air or other fluids to follow the nearby curved or inclined surface. The Coanda effect is generally applied to any situation where the boundary layer of fluid meets a solid surface and follows the surface around a curve. In this case, the exit direction 79 of the slot passage is a curve convex relative to the diffuser section 62 main flow passage for directing air from the passage 48. As will be described, a simplified isometric view of the blowing slot geometry is depicted in FIG. 6.

Figure 7:
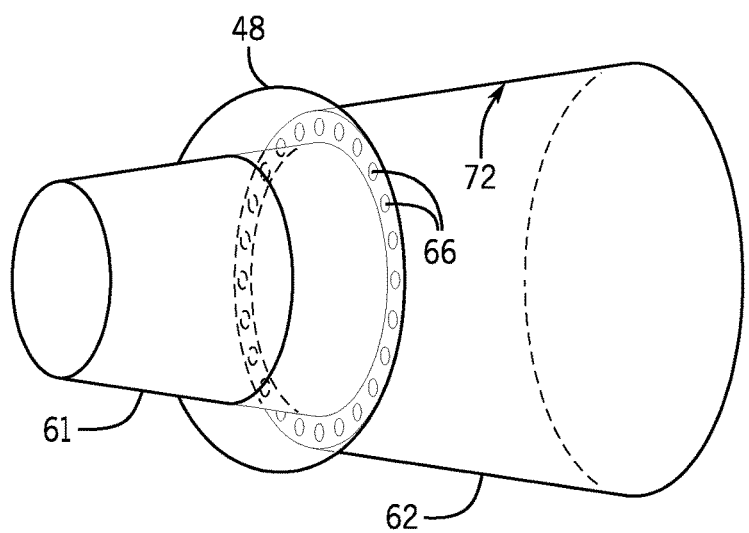
FIG. 7 is a perspective view of an embodiment of the expansion section and the diffuser section of the gas turbine of the gas turbine system.

As described in FIG. 7, discrete holes have the advantage of easier implementation in a gas turbine exhaust system. Pressurized fluid 40 can be collected into passages 48 coupled to the cooling manifold 50. Subsequently, small energizing ports 66 connected to the passage 48 can be used to inject pressurized fluid 40 into the main stream. In some embodiments, the cross section of the passage 48 may be at least 15-20 times larger than the diameters of the energizing ports 66 to avoid injection with circumferential variation. Injection of pressurized fluid 40 through discrete holes may mix higher momentum free stream flow with the lower momentum boundary layer and acts to energize the boundary layer.

The energizing ports 66 may be circular, triangular, square shaped, rectangular, or any other polygonal shape. An advantage of the energizing ports 66 being circular is that a circular shape may promote the development of three-dimensional disturbances in the boundary layer along the diffuser section 62 walls. This may enhance mixing and may decrease the required mass-flow rate of secondary pressurized fluid 40 therefore increasing the effectiveness of the blowing scheme.

An alternate embodiment, which could substantially decrease the required amount of pressurized fluid 40 may include injecting pulsating pressurized fluid 40 in the diffuser wall boundary layers to prevent separation. Unsteady injection may be more effective at delaying separation than steady injection due to the artificial generation and development of coherent structures in the diffuser wall boundary layers which substantially enhance the mixing of the low momentum boundary layer flow with a high momentum core. Factors such as pulsing frequency, duty cycle and amplitude of the pulsations may be considered if this embodiment is employed.

Returning to FIG. 2, the passage 48 can be configured to direct the pressurized fluid 40 to the areas or sections of the diffuser section 62 of the gas turbine system 10 with weaker boundary layers. Tendencies for weaker boundary layers may occur in the diffuser section due to the adverse pressure gradient of diffusing flow. These weakened boundary layers can lead to separated flow and increased energy losses in the diffuser section. To strengthen the boundary layer and avoid premature separation, the passage 48 can be configured to direct the pressurized fluid 40 to the diffuser section 62 through a plurality of energizing ports 66. One or more of the energizing ports 66 may be utilized at a time to distribute the cooling fluid 40 to the interior surface 72 of the diffuser section 62 to strengthen the boundary layer of the exhaust gases 38 through the diffuser section 62. Controlling the flow of the pressurized fluid 40 and directing it to strategic areas downstream of the last expansion section (e.g., last row of the turbine blades) may reduce flow separation and pressure losses of the flow of the exhaust gases 38 through the diffuser section 62. Reduced flow separation along the flow of the exhaust gases 38 may increase the effective area 67 for the for the main flow path 68 of the exhaust gases 38 to flow through. Additionally, directing the pressurized fluid 40 from the cooling manifold 50 to the diffuser section 62 may reduce or eliminate pressurized fluid 40 vented within the enclosure 11 that at least partially surrounds the gas turbine 32, thus reducing stress and/or temperature effects on operators and/or controllers (e.g., circuitry elements, processors, memory) within the enclosure 11.

The controller 74 is coupled to at least one valve assembly 82 to control the one or more valves via control lines 80. The controller 74 may be configured to open and close the valves of the valve assembly 82 to control the flow of the pressurized fluid 40. In certain embodiments, the controller 74 may utilize the memory 76 to store instructions and the processor 78 to process the instructions. In some embodiments, the controller 74 may determine via instructions stored in the memory 76 the desired flow rate of the pressurized fluid 40. In certain embodiments, a first processor 78 may receive a first set of instructions to control the flow rate of pressurized fluid 40 to the cooling manifold 50. In certain embodiments, the second processor 78 may receive a second set of instructions to control the flow rate of the pressurized fluid 40 to the passage 48 for distribution to the diffuser section 62. The pressurized fluid 40 may be received directly from the cooling path 84, or the pressurized fluid 40 may be received after it has been utilized to cool the turbine casing 46. In some embodiments, the controller 74 may determine via instructions stored in the memory 76 that the desired flow rate of the pressurized fluid 40 to be injected into the passage 48 should be increased to maintain the boundary layer, thereby reducing the pressure loss of the exhaust gases 38 in the diffuser section 62. In some embodiments, the controller 74 may determine via instructions stored in the memory 76 the desired pressure of the pressurized fluid 40 to be injected into the passage 48 may be decreased without substantially affecting the pressure loss of the exhaust gases through the diffuser section 62. Still further, in some embodiments, the controller 74 may determine via instructions stored in the memory 76 the desired temperature of the pressurized fluid 40 can be injected into the passage 48 at a lower temperature if weaker (e.g., more brittle) materials are included in the diffuser section 62 of the turbine 32. In some embodiments, the further downstream of the last expansion section of the turbine 32, the more likely weaker areas of the boundary layer are likely to be present due to more aggressive diffusion angles of the diffuser section 62. The angle between the interior surface 72 and an axial axis 77 of the diffuser section 62 may range from approximately 5° to 30°. In some embodiments, the diffuser section 62 may include additional energizing ports 66 disposed further downstream along the interior surface 72 within the diffuser section 62. One or more (e.g., all) of the energizing ports 66 may be utilized at a time to distribute the spent cooling fluid 40 to the diffuser section 62.

Figure 4:
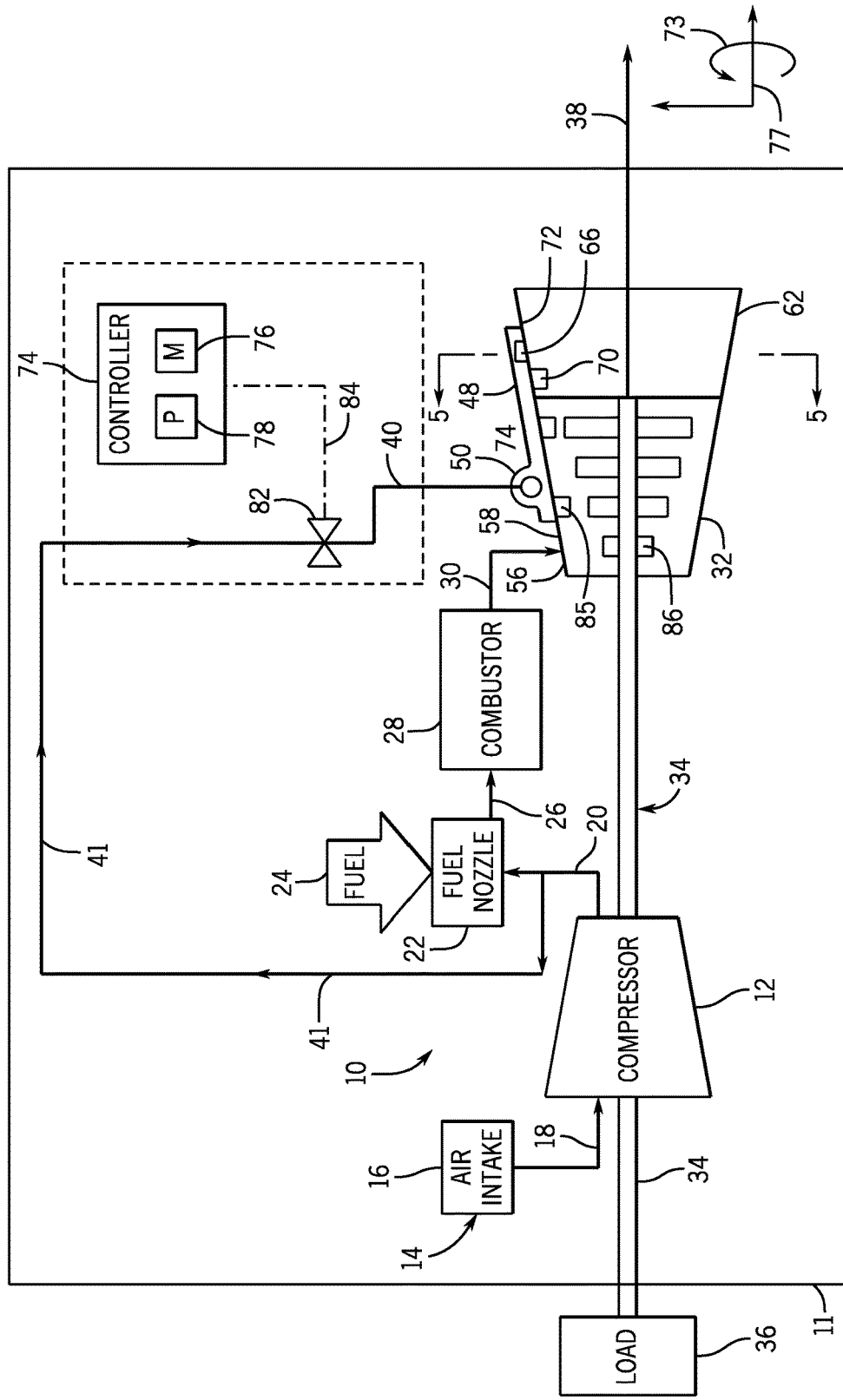
FIG. 4 is a block diagram of an embodiment of a gas turbine system utilizing compressed air from a compressor in the exhaust energy recovery system.

FIG. 4 illustrates a block diagram of an embodiment of a gas turbine system utilizing compressed air from a compressor in the exhaust energy recovery system. As described above, ambient air 14 may be fed to the air intake 16 to send inlet air 18 to the compressor 12. The compressor 12 utilizes its internal components, including compressor blades and vanes, to pressurize the inlet air 18 to form pressurized air 20. Fuel 24 and pressurized air 20 are combined to create an air-fuel mixture 26. The air-mixture 26 is sent to the combustor 28. The combustor 28 ignites and combusts the air-fuel mixture 26, creating combustion products 30. The combustion products 30 are sent to the gas turbine 32 for expansion to drive the load 36 coupled to the shaft 34. In some embodiments, a portion 41 of the pressurized air 20 is directed from the compressor outlet to the cooling system 44. The portion 41 of the pressurized air 20 may be utilized to actively control the clearance of blades 86 in the gas turbine 32. This occurs by directing the portion 41 of the pressurized air 20 to the turbine casing via the cooling manifold 50. The cooling manifold 50 receives the portion 41 of the pressurized air 20. All or a portion of the pressurized air 41 may be distributed through energizing ports 66. In some embodiments, the amount of pressurized air flowing through the energizing ports 66 may include approximately 0.01 to 4%, 0.1 to 3%, 1 to 2%, and all subranges therebetween of the pressurized air 20. The amount of pressurized air 41 flowing through the energizing ports 66 may be pressurized to approximately 0.001 to 50 psig, about 0.01 to 40 psig, about 0.1 to 30 psig, or about 1 to 20 psig (about 0.007 to 345 kpa, about 0.067 to 276 kpa, about 0.689 kpa to 207 kpa, or about 6.895 kpa to 138 kpa) relative to the ambient environment.

In some embodiments, a valve assembly 82 can include one or more valves of the same or different type to control the flow of the pressurized portion 41 to the cooling manifold 50. For example, the valve assembly 82 can include one or more gate valves, butterfly valves, globe valves, ball valves, check valves, or other valve types. Moreover, the valve assembly 82 may include combinations of valves. The valve assembly 82 may be configured to adjust the total volumetric flow to the turbine casing 58 via the cooling manifold 50. Additionally, the valve assembly 82 may be configured to control the distribution of the flow to the cooling manifold 50. The cooling manifold 50 may include multiple openings 60, which can be disposed around the cooling manifold 50. The openings 60 may be utilized all at once, or as determined by the sensors 85, prior to injecting the pressurized air 20 to the passage 48.

After the portion 41 of the pressurized air 20 is utilized to control the clearance of the blades 86, it may be directed via the passage 48 to energize the boundary layer of the diffuser section 62 of the gas turbine 32, as discussed above. Controlling the flow of the cooling fluid 40 (e.g., pressurized portion 41) and directing it to strategic areas downstream of the expansion section 61 (e.g., downstream of the last row of the turbine blades 86) enables heat energy of the spent cooling fluid 40 to be recovered and utilized to do additional useful work. Additionally, directing the cooling fluid 40 from the cooling manifold 50 to the diffuser section 62 may reduce or eliminate cooling fluid 40 vented within the enclosure 11 that at least partially surrounds the gas turbine 32.

Figure 5:
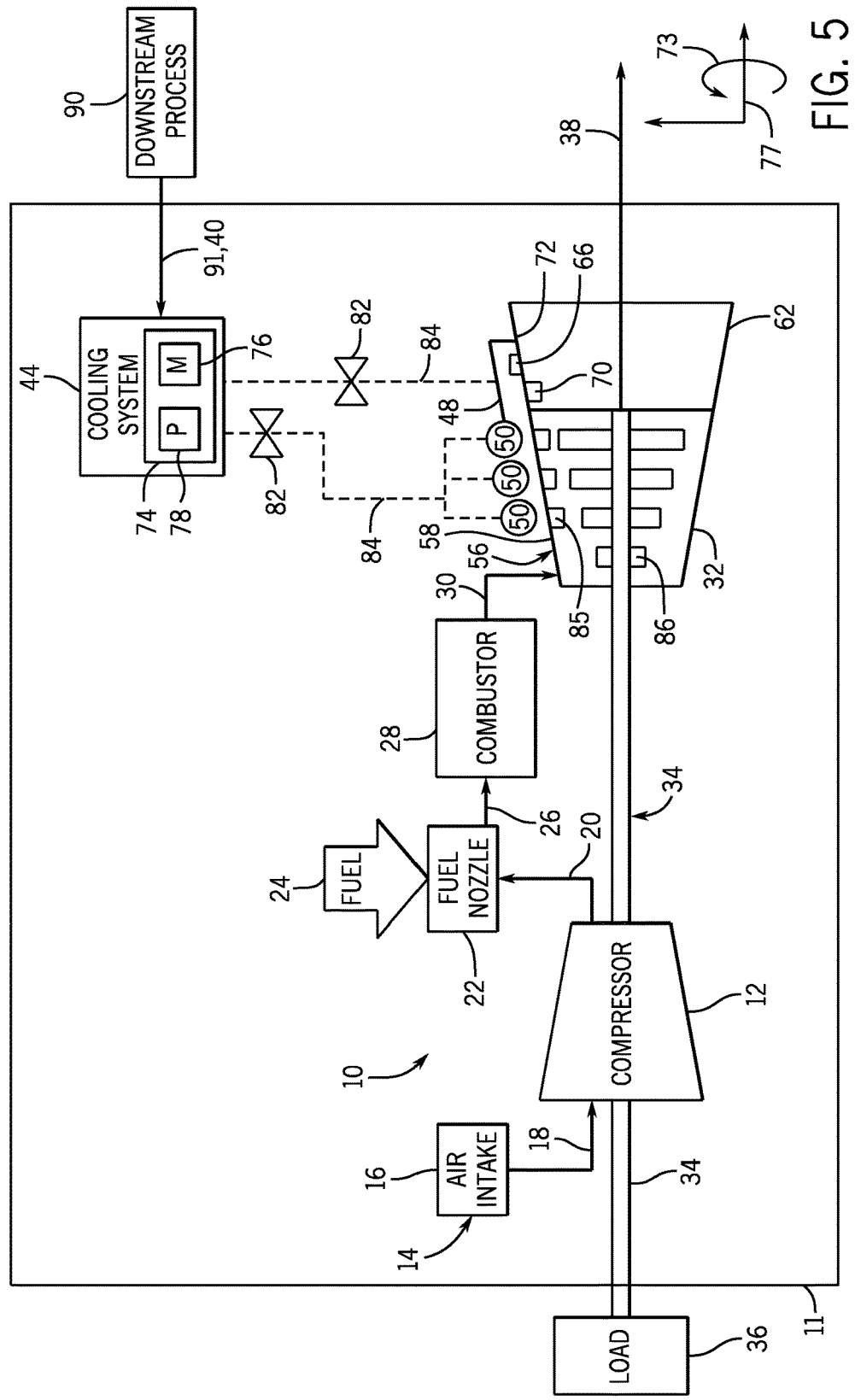
FIG. 5 is a block diagram of an embodiment of a gas turbine system utilizing compressed air from a downstream process in the exhaust energy recovery system.

FIG. 5 illustrates a block diagram of an embodiment of a gas turbine system utilizing compressed air from a downstream process in the exhaust energy recovery system. In some embodiments, the pressurized fluid 40 may be a low pressure steam 91 (e.g., low grade waste steam) from a downstream process 90 (e.g., heat recovery steam generator (HRSG), steam turbine) may be utilized to actively control the clearance of blades 86 in the gas turbine 32. This occurs by directing the low pressure steam 91 to the exterior surface 56 of the turbine casing via the one or more cooling manifolds 50. The one or more cooling manifolds 50 can receive a portion of the low pressure steam 91, or one cooling manifold 50 may receive all of the low pressure steam 91. In one embodiment, the valve assembly 82 can include two or more valves configured to direct the low pressure steam 91 to two or more separate cooling manifolds 50. The separate cooling manifolds 50 may utilize separate sensors 85 to provide an output signal corresponding to the conditions at its location. Utilizing separate cooling manifolds 50 for different areas of the turbine casing 58 enables hotter sections of turbine casing 58 to receive a higher volume of the low pressure steam 91 to cool the turbine casing 58 and control the clearance of the blades 86 from an interior surface 54 of the gas turbine 32. The low pressure steam 91 can be directed through energizing ports 66 to energize the boundary layer, thereby strengthening the boundary layer and discouraging separation of the exhaust gases 38 from the interior surface 72 of the diffuser section 62. The one or more energizing ports 66 of the flow collecting passage 48 can be connected to the cooling manifolds 50 and configured to receive the low pressure steam 40 utilized in the cooling manifolds 50.

The one or more passages 48 can be utilized all at once or one or more at a time. In some embodiments, one or more energizing ports 66 may be coupled to the passages 48. The energizing ports 66 may be disposed circumferentially 73 or axially 77 around the diffuser section 62. The controller 74 may be configured to open and close the valves to control the flow of the low pressure steam 91 through the valve assembly 82 to the one or more passages 48. In certain embodiments, the controller 74 may include a memory 76 to store instructions and a processor 78 configured to the process the instructions. In some embodiments, the valve assembly 82 can include one or more valves of the same or different type. For example, the valve assembly 82 can include one or more gate valves, butterfly valves, globe valves, ball valves, check valves, or other valve types. Moreover, the one or more valve assemblies 82 may include combinations of valves. The valve assembly 82 may be configured to adjust the total volumetric flow to the passage 48. Additionally, the valve assembly 82 may be configured to control the distribution of the flow to the passage 48. The passage 48 may include multiple energizing ports 66, which can be coupled to the passage 48 and disposed circumferentially 73 and/or axially 77 around the diffuser section 62.

In some embodiments, the one or more passages 48 may be used with or without the cooling manifold 50. That is, the one or more passages 48 may receive the pressurized fluid 40 from the cooling manifold 50, or one or more passages may receive the pressurized fluid 40 directly from another source (e.g., compressor section, HRSG, downstream process). In some embodiments, the controller 74 may determine via instructions stored in the memory 76 that the desired flow rate of the low pressure steam 40 can be injected into the passage 48 at a higher flow rate due to greater energizing needs. In some embodiments, the controller 74 may determine via instructions stored in the memory 76 that the desired pressure of the low pressure steam 40 can be injected into the passage 48 at a lower pressure through the diffuser section 62. As will be appreciated, energizing ports 66 are utilized in the diffuser section 62 of the gas turbine 32 to allow sections with weaker boundary layers to receive a higher volume of low pressure steam 91 to reenergize the boundary layer and increase the flow path for the main flow 68.

FIG. 6 illustrates a perspective view of an embodiment of the expansion section 61 and diffuser section 62 of the gas turbine utilized in the gas turbine system. In some embodiments, an annular region 88 of the diffuser section 62 at least partially surrounds a portion of the expansion section 61. The flow collector passage 48 directs the pressurized fluid 40 through the annular region 88 between the diffuser section 62 and the exterior surface 56 of the expansion section 61 of the turbine casing 46. That is, the annular region 88 forms the energizing port 66 with a substantially annular shape about the expansion section 61. As described above, the energizing port 66 directs the pressurized fluid 40 along an interior surface 72 of the diffuser section 62, thereby energizing the boundary layer along the interior surface 72 to reduce or eliminate separation of the main flow of exhaust gases 38 from the interior surface 72. FIG. 7 illustrates a perspective view of an embodiment of the expansion section 61 and the diffuser section 62 of the gas turbine 32 of the gas turbine system. In some embodiments, flow collector passage 48 directs the pressurized fluid 40 to a plurality of energizing ports 66 that are circumferentially disposed about the exterior surface 56 of the expansion section 61 and upstream of the diffuser section 62. The plurality of energizing ports 66 may direct the pressurized fluid 40 to discrete points along the interior surface 89 of the diffuser section 62.

Figure 8:
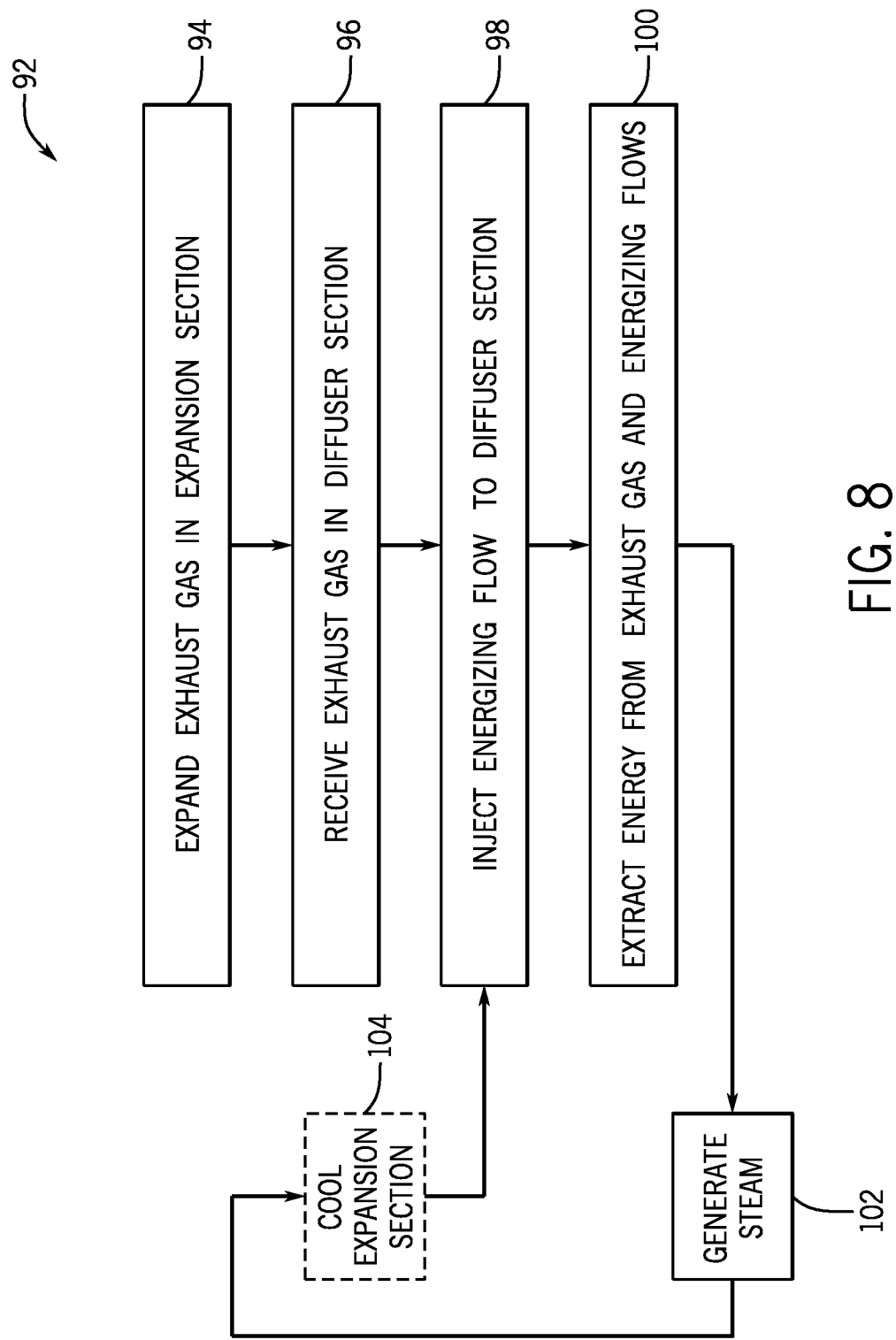
FIG. 8 is a flow chart illustrating an embodiment of a method for improving exhaust energy recovery.

FIG. 8 is a flow chart demonstrating an embodiment of a method 92 for improving exhaust energy recovery by injecting clearance control impingement (e.g., cooling) air downstream of the expansion section of the gas turbine. The gas turbine expands (block 94) a gas flow (e.g., exhaust gas) through a plurality of turbine blades in the expansion section. The exhaust gas flows downstream of the last turbine blades of the expansion section and is received (block 96) in the diffuser section of the turbine. Energizing (e.g., strengthening) the boundary layers to the diffuser section reduces the pressure loss of the exhaust gases through the diffuser section, and enables the energy of the cooling fluid to be extracted (block 100) via the downstream system (e.g., expansion turbine, steam turbine, HRSG). Accordingly, increased energy recovery from the exhaust gases and the cooling fluid may increase the overall thermodynamic cycle efficiency of the gas turbine system. In some embodiments, the energy extracted (block 100) from the exhaust gas is used to generate (block 102) steam. The steam generated may be utilized for various purposes, such as driving a steam turbine or preheating a fluid flow of the gas turbine system. Additionally, energy may be extracted from the exhaust gas to utilize in the diffuser section. In some embodiments, the expansion section of the turbine is cooled (block 104) utilizing the generated steam.

Technical effects of the invention include directing a cooling fluid through a plurality of energizing ports to energize boundary layer of a diffuser section, thereby reducing pressure loss of the exhaust gases through the diffuser section and increasing the available energy for the expansion section and for downstream systems. The cooling fluid can be utilized from other areas in the gas turbine system to do more useful work downstream of the last expansion section of the gas turbine, thus enhancing overall thermodynamic cycle efficiency of the gas turbine system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a turbine comprising:
an expansion section configured to expand an exhaust flow in a downstream direction, wherein the expansion section comprises a plurality of stages disposed within a turbine casing of the expansion section;
a cooling manifold disposed about an exterior surface of the turbine casing and configured to direct a cooling flow onto the exterior surface; and
a diffuser section coupled downstream of the expansion section, wherein the diffuser section is configured to receive the exhaust flow along an exhaust path and an energizing flow along a wall, and the diffuser section comprises:
the wall comprising an inner surface, wherein the wall is disposed about the exhaust path; and
an energizing port disposed in the wall at or downstream of a last stage of the plurality of stages of the expansion section, wherein the energizing port is configured to receive at least a portion of the cooling flow from the cooling manifold as the energizing flow, direct the energizing flow along the inner surface of the wall to energize a boundary layer along the wall, and a first pressure of the energizing flow is greater than a second pressure of the exhaust flow at the energizing port.

2. The system of claim 1, wherein the energizing flow comprises steam or carbon dioxide.

3. The system of claim 1, comprising a compressor coupled to the turbine, wherein the turbine is configured to drive the compressor, and the cooling flow comprises a bleed flow from the compressor.

4. The system of claim 1, comprising a compressor coupled to the turbine and a compressor discharge casing, wherein the turbine is configured to drive the compressor, the compressor discharge casing is configured to receive a compressed air flow from the compressor, and the compressor discharge casing is disposed about the cooling manifold and the expansion section of the main turbine casing.

5. The system of claim 4, comprising an enclosure, wherein the turbine comprises an aero-derivative gas turbine, and the compressor discharge casing is disposed within the enclosure.

6. The system of claim 1, comprising a downstream system coupled to the expansion section, wherein the downstream system is configured to extract energy from the exhaust flow and the energizing flow.

7. The system of claim 6, wherein the downstream system comprises a heat recovery steam generator (HRSG).

8. The system of claim 1, wherein an inner diameter of the wall increases in the downstream direction, and an angle between the wall and an axis of the diffuser section is approximately 5 to 30°.

9. A method comprising:
expanding an exhaust gas through a plurality of turbine stages of a turbine section, wherein the exhaust gas flows in a downstream direction through the plurality of turbine stages, wherein the plurality of turbine stages is disposed within a turbine casing of the turbine section;
receiving the exhaust gas in a diffuser section downstream of the turbine section;
directing a cooling flow onto an exterior surface of the turbine casing via a cooling manifold disposed about the exterior surface; and
energizing a boundary layer downstream of an energizing port of the diffuser section via an energizing flow, wherein the energizing flow includes at least a portion of the cooling flow directed from the cooling manifold onto the exterior surface, and wherein the boundary layer is disposed along an inner surface of a wall of the diffuser section, the energizing flow has a higher pressure than the exhaust gas at the energizing port, and the boundary layer is configured to reduce a pressure loss of the exhaust gas through the diffuser section.

10. The method of claim 9, comprising:
extracting energy from the energizing flow and the exhaust gas via a downstream system coupled to the diffuser section.

11. The method of claim 10, wherein the downstream system comprises a heat recovery steam generator (HRSG).

12. The method of claim 11, wherein the energizing flow comprises a steam flow, and the steam flow is received from the HRSG.

13. The method of claim 9, comprising controlling a clearance between the turbine casing and rotating components of the turbine section via cooling the turbine casing with the cooling flow.

14. The method of claim 10, wherein the cooling flow comprises a steam flow received from the downstream system.

15. The method of claim 14, comprising controlling a clearance between the turbine casing and rotating components of the turbine section via cooling the exterior surface of the turbine casing with the cooling flow.

16. The method of claim 9, wherein a pressure of the energizing flow is between 1 to 20 psig relative to an ambient environment.

17. The system of claim 7, wherein the downstream system comprises a steam turbine, and the energizing flow comprises a low pressure steam output from the steam turbine.

18. The system of claim 1, wherein the diffuser section comprises a passage extending between the exterior surface of the turbine casing and the energizing port to direct the portion of the cooling flow to the energizing port.

19. The method of claim 9, comprising:
receiving the portion of the cooling flow at a passage in fluid communication with the cooling manifold; and
directing the portion of the cooling flow along the passage from an opening of the passage at the exterior surface of the turbine casing to the energizing port.

* * * * *